Figure 1:
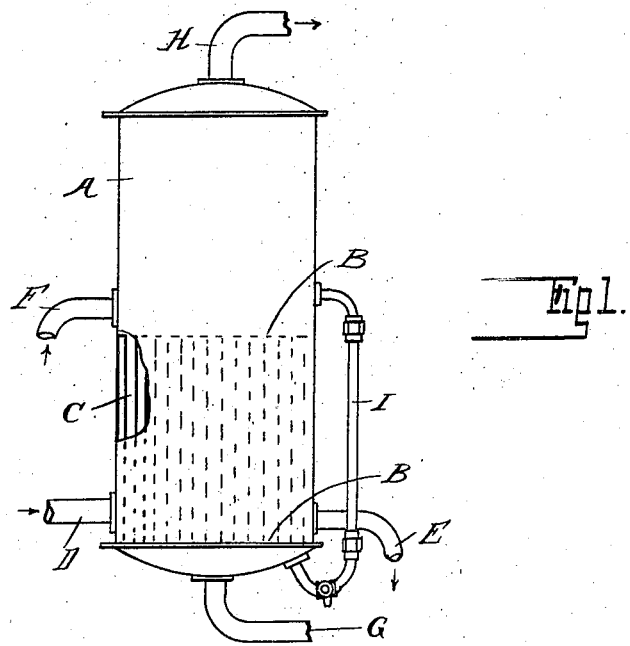

L. NAUDET.
PROCESS AND APPARATUS FOR THE EVAPORATION OF SUGAR JUICE.
APPLICATION FILED JUNE 28, 1915.

1,190,317.

Patented July 11, 1916.

Inventor
Leon Naudet

By Whittemore Hulbert & Whittemore
Attorney

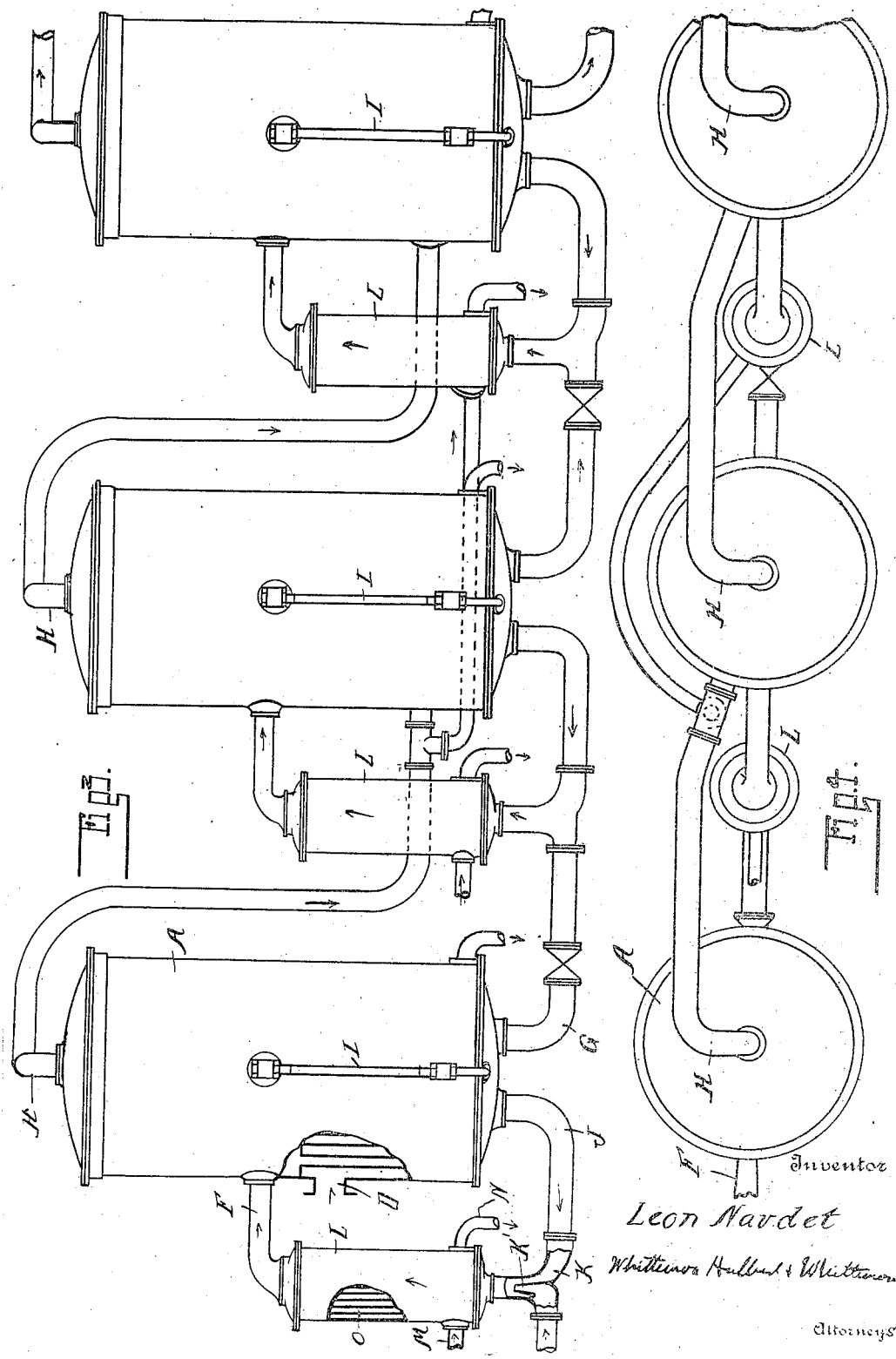

UNITED STATES PATENT OFFICE.

LEON NAUDET, OF CHELLES, FRANCE.

PROCESS AND APPARATUS FOR THE EVAPORATION OF SUGAR-JUICE.

1,190,317.     Specification of Letters Patent.     Patented July 11, 1916.

Application filed June 28, 1915. Serial No. 36,825.

*To all whom it may concern:*

Be it known that I, LEON NAUDET, a citizen of the Republic of France, residing at Chelles, in the country of France, have invented certain new and useful Improvements in Processes and Apparatus for the Evaporation of Sugar-Juice, of which the following is a specification, reference being had therein to the accompanying drawings.

The invention relates to the art of evaporating liquids, having more particular reference to the evaporation of sugar juice.

It is the object of the invention to increase the efficiency of the evaporating apparatus, and further to provide a simple and inexpensive means of changing installations which are defective in their operation.

My improvements are applicable to single unit evaporators but are more particularly advantageous in multiple units where the liquid to be evaporated is passed successively from one evaporator to another with a decrease in pressure and temperature in each succeeding section.

In the present state of the art multiple unit or "multiple effect" evaporators comprise a series of tanks or receptacles, each being provided with a steam compartment and one or more liquid compartments. To increase the heating surface small flues are arranged within the tanks, being connected at their opposite ends in partitions which separate the compartments. In operation, steam is supplied to the steam compartment of the first of the tanks, heating the tubes and causing the boiling of the liquid on the opposite surfaces thereof. The vapor thus driven off by the boiling of the liquid is used for heating the second tank, and the vapor from the latter for heating the next tank and so on throughout the series, the pressure in each succeeding tank being lower and in the last of the series being the highest vacuum practically attainable. The juice or liquid to be evaporated is also passed from tank to tank, being progressively increased in concentration to the end of the series.

In the design of apparatus as above described it is obvious that the heating surface in successive tanks should be properly proportioned. This is for the reason that if one of the evaporators is not of proper efficiency it will cripple the operation of the other evaporators, and so reduce the efficiency of the entire installation. Frequently after the plant is installed it is found that there is a lack of balance between the different units, but the correction of the mistake by the substitution of a larger or smaller unit would involve large expense. The efficiency of the apparatus is also dependent upon the amount of heat that can be transferred from the steam to the liquid per unit of time and surface. The rate of transference varies with the rate of flow of the liquid over the heated surface, and the higher the rate of flow the greater will be the efficiency in evaporation.

With the present invention I have increased the efficiency of the apparatus by a novel method of increasing the flow of liquid over the heated surface, which consists essentially in stimulating a circulatory flow in each unit by the force of the moving current of liquid through the system. In other words, there is a constant flow of liquid through the system as it passes from one evaporator to another, and the force of the moving liquid for each evaporator may be utilized in an injector for moving a larger volume of the fluid and circulating it over the heating surface.

Another feature of my invention is the provision for correcting installations that are out of balance by placing additional heating surface in the liquid circuit. This can be done at small expense by a supplemental heater, which is placed in the inlet conduit for the juice and is also in the endless circuit which is propelled by the injector.

Figure 2:
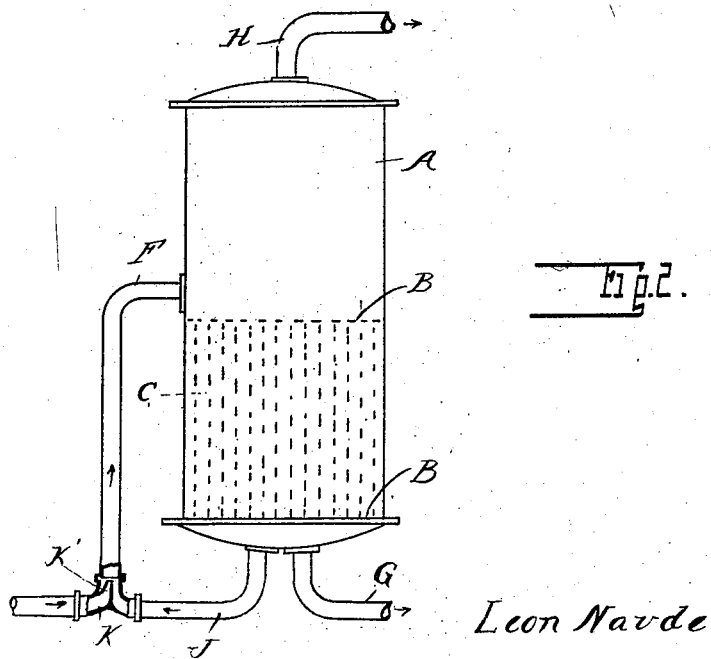

In the drawings: Figures 1 and 2 are diagrammatic side elevations of evaporators illustrating the theory of operation of my improved process; and Figs. 3 and 4 are respectively a side elevation and plan view of a multiple unit evaporator to which my improvements are applied.

As shown in Fig. 1, A is the outer tank or casing of one of the evaporator units, which is divided by partitions B and B' into compartments connected by small tubes or flues C extending from partition to partition. The space between the partitions and surrounding the flues constitutes the steam compartment, to which steam is supplied through a conduit D, while a conduit E carries away the water of condensation.

F is an inlet conduit for the juice above the partition B, and G is an outlet conduit which leads from the lower end of the tank to the next unit.

H is a vapor conduit connected to the upper end of the tank and leading to the steam space of the next unit.

I is a gage for indicating the level of the liquid within the tank.

The construction as above described is a standard construction used in multiple unit or "multiple effect" evaporators, and its efficiency depends upon the amount of heating surface and the rate of flow of liquid over the same. The efficiency may be increased without change in the amount of heating surface by the construction shown in Fig. 2, in which J is a return conduit connected to the bottom of the tank and leading to the inlet conduit F. K is an injector connected into the conduit F, the nozzle K' of which forms a jet of incoming fluid which imparts its velocity to a larger jet of fluid returning through the conduit J. Thus the rate of flow of the liquid into and out from the tank C is greatly increased, which results in a corresponding increase in the rate of flow over the heating surface and the increase in efficiency thereof.

Where it is desired to apply my improvements to a plant already installed, all that is necessary is to supply the injector K and the return circulating pipe J. If, however, it is desired to still further increase the efficiency or to correct a lack of balance between the units I may employ the construction illustrated in Figs. 3 and 4. In this modification a small additional tank L is connected in to a vertical portion of the conduit F and in the circuit formed by the return conduit J. Thus the casing L is provided with a steam chamber supplied with steam from a conduit M and an outlet N for the water of condensation. The injector K is placed at the base of the casing and therefore not only the inflowing liquid from the conduit F but also the circulating liquid from the conduit J is passed through the heater and the small tubes or flues O thereof before reëntering the tank A. Obviously the amount of heating surface in this auxiliary heater may be readily varied, and in this way defects in the original installation are remedied as well as increasing the efficiency of each unit of the evaporator. It is also apparent that the units of a multiple system may be balanced by differentially recirculating the fluid in the units by varying the efficiencies of the injectors K.

By my improved method the circulation of the liquid is accomplished without the use of additional force or mechanically-driven pumping or circulating devices. Furthermore it may be applied to the units which are operating under less than atmospheric pressure without the use of stuffing boxes or other devices for maintaining air-tight joints. In other words, there is nothing to break the seal.

What I claim as my invention is:—

1. In an evaporator having a heating surface, the combination with means for supplying liquid thereto, of means actuated by the liquid supply for accelerating the flow of liquid over the heating surface.

2. In an evaporator having a heating surface, the combination with means for supplying liquid thereto, of means actuated by the inflow of said liquid for re-circulating the liquid in said evaporator and accelerating the flow over the heating surface.

3. In an evaporator having a heating surface, the combination with means for supplying liquid thereto, of an injector operated by the inflowing liquid for re-circulating the liquid within said evaporator to increase the flow over the heating surface.

4. The combination with a multiple unit evaporator, each unit having a heating surface and a conduit for flowing the liquid from one unit to another, of means actuated by the flow of liquid through said conduit for moving a larger volume of fluid over the heating surface.

5. In an evaporator, the combination with a conduit for supplying liquid thereto, of a supplemental evaporator connected to said supply conduit, a return conduit from said evaporator to said supplemental evaporator, and an injector operated by the fluid supply for circulating the fluid through said return circuit and supplemental evaporator.

6. In a multiple-unit evaporator, the combination with a plurality of units and means for flowing the liquid from one unit to another, of means actuated by the flow of liquid for differentially circulating the liquid in the several units to balance the same in efficiency.

7. The method of evaporating liquid, comprising constantly feeding the liquid through an evaporating system, and forcing by said flow a re-circulation of the liquid within the system.

8. The method of evaporating liquid, comprising the constant flow of liquid through a multiple-unit system, and in propelling by the flowing liquid a re-circulation in a portion of the system.

9. The method of balancing the units of a multiple-unit evaporator, comprising the differential re-circulation of the fluid in said units.

10. The method of balancing units in a multiple-unit evaporating system, comprising constantly flowing the fluid from one unit to another and propelling by the flowing fluid a differential re-circulation of the fluid in said units.

11. In an evaporator, the combination with an evaporating unit and means for flowing fluid thereto, of a supplemental unit connected into the fluid supply, a return fluid circuit from said main unit to said supplemental unit, and an injector operated by the inflowing fluid for propelling circulation through said return circuit and supplemental unit.

12. In an evaporator having a heating surface, the combination with means for supplying liquid thereto, of means for re-circulating the liquid in said evaporator and accelerating the flow over the heating surface.

13. The combination with a main and a supplemental evaporator of means for supplying liquid thereto, and means for re-circulating the liquid through the two evaporators.

14. The method of evaporating liquid comprising the constant flow of liquid through a system including a main and a supplemental evaporator, and the re-circulation of the liquid through said evaporators.

15. The method of balancing the units of a multiple unit evaporator, comprising the recirculating of the fluid in said units, and differential heating of the recirculating fluid in the several units.

16. In a multiple unit evaporator, the combination with a plurality of units and means for flowing the liquid from one unit to another, of means actuated by the flow of the liquid for recirculating the liquid in said units, and means for differentially heating the recirculating liquid in the several units.

17. In a multiple unit evaporator, the combination with a plurality of main units, and means for flowing the liquid from one to another, of supplemental units respectively associated with the main units, and means for recirculating the liquid through each main unit and the associated supplemental unit.

18. In a multiple unit evaporator, the combination with a plurality of unbalanced main units, of supplemental units respectively associated with the main units having heating surfaces varied to balance the main units and means for flowing the liquid through the main and supplemental units.

In testimony whereof I affix my signature in presence of two witnesses.

LEON NAUDET.

Witnesses:
 WM. J. BELKNAP,
 HENRIETTA E. BOWMAN.